US008379957B2

(12) United States Patent
Slabaugh et al.

(10) Patent No.: US 8,379,957 B2
(45) Date of Patent: Feb. 19, 2013

(54) SYSTEM AND METHOD FOR SEGMENTATION OF ANATOMICAL STRUCTURES IN MRI VOLUMES USING GRAPH CUTS

(75) Inventors: Gregory G. Slabaugh, Princeton, NJ (US); Gozde Unal, West Windsor, NJ (US); Tong Fang, Morganville, NJ (US); Huy-Nam Doan, Savigny sur Orge (FR)

(73) Assignee: Siemens Corporation, Iselin, NJ (US)

( * ) Notice: Subject to any disclaimer, the term of this patent is extended or adjusted under 35 U.S.C. 154(b) by 1283 days.

(21) Appl. No.: 11/620,078

(22) Filed: Jan. 5, 2007

(65) Prior Publication Data

US 2007/0160277 A1 Jul. 12, 2007

Related U.S. Application Data

(60) Provisional application No. 60/758,407, filed on Jan. 12, 2006.

(51) Int. Cl.
*G06K 9/00* (2006.01)
*G06K 9/34* (2006.01)

(52) U.S. Cl. ......... 382/132; 382/100; 382/128; 382/173
(58) Field of Classification Search .................. None
See application file for complete search history.

(56) References Cited

U.S. PATENT DOCUMENTS

| | | | | |
|---|---|---|---|---|
| 6,332,034 | B1 * | 12/2001 | Makram-Ebeid et al. | 382/128 |
| 6,430,430 | B1 * | 8/2002 | Gosche | 600/410 |
| 6,813,373 | B1 * | 11/2004 | Suri et al. | 382/128 |
| 6,895,107 | B2 * | 5/2005 | Park et al. | 382/133 |
| 6,973,212 | B2 * | 12/2005 | Boykov et al. | 382/173 |
| 7,136,516 | B2 * | 11/2006 | Alyassin | 382/128 |
| 7,236,618 | B1 * | 6/2007 | Chui et al. | 382/128 |
| 7,672,492 | B2 * | 3/2010 | Shen et al. | 382/128 |
| 7,813,531 | B2 * | 10/2010 | Becker | 382/115 |
| 2002/0048401 | A1 * | 4/2002 | Boykov et al. | 382/173 |
| 2003/0044055 | A1 * | 3/2003 | Park et al. | 382/130 |
| 2005/0111757 | A1 * | 5/2005 | Brackett et al. | 382/294 |
| 2005/0113679 | A1 * | 5/2005 | Suryanarayanan et al. | 600/425 |
| 2005/0134587 | A1 * | 6/2005 | Geiger et al. | 345/423 |
| 2005/0163375 | A1 * | 7/2005 | Grady | 382/180 |
| 2006/0104516 | A1 * | 5/2006 | Lee et al. | 382/199 |
| 2006/0214932 | A1 | 9/2006 | Grady et al. | |
| 2006/0239519 | A1 * | 10/2006 | Nowinski et al. | 382/128 |
| 2007/0036432 | A1 * | 2/2007 | Xu et al. | 382/173 |
| 2007/0116338 | A1 * | 5/2007 | Fidrich et al. | 382/128 |
| 2010/0049035 | A1 * | 2/2010 | Hu et al. | 600/425 |
| 2010/0278405 | A1 * | 11/2010 | Kakadiaris et al. | 382/131 |

OTHER PUBLICATIONS

Michael et al, Automated SEgmentation of MR Images of Brain Tumors, Feb. 2001, Radiology, 218, pp. 586-591.*
E. D. Angelini, et al., "Segmentation and Quanitative Evaluation of Brain MRI Data with a Multiphase Three-Dimensional Implicit Deformable Model", SPIE International Symposium, Medical Imaging 2004, San Diego, CA USA.
Y.Boykov, et al., "Interactive Graph Cuts for Optimal Boundary & Region Segmentation of Objects in N-D Images", Proc. of Intl Conf. on Comp. Vision, vol. 1, pp. 105-112, 2001.

(Continued)

*Primary Examiner* — Claire X Wang
*Assistant Examiner* — Avinash J Yentrapati

(57) ABSTRACT

A system and method for segmentation of anatomical structures in MRI volumes using graph cuts is disclosed. In this method, a template is registered to an MRI brain volume. The template identifies seed points of anatomical brain structures, such as the cerebrum, the cerebellum, and the brain stem, in the MRI brain volume. Any or all of the anatomical brain structures can be segmented using graph cuts segmentation initialized based on the seed points identified by the template. It is possible to segment each of the anatomical brain structures by performing a hierarchical three-phase segmentation process including brain/non-brain segmentation, cerebrum/cerebellum and brain stem segmentation, and cerebellum/brain stem segmentation.

24 Claims, 5 Drawing Sheets

OTHER PUBLICATIONS

Y. Boykov, et al., "An Experimental Comparison of Min-Cut/Max-Flow Algorithms for Energy Minimization in Vision", IEEE Trans. on PAMI, vol. 26, No. 9, pp. 1124-1137, Sep. 2004.

D. W. Shattuck, et al., "Magnetic Resonance Image Tissue Classification Using a Partial Volume Model", NeuroImage 13, 2001, pp. 856-876.

* cited by examiner

SYSTEM AND METHOD FOR SEGMENTATION OF ANATOMICAL STRUCTURES IN MRI VOLUMES USING GRAPH CUTS

This application claims the benefit of U.S. Provisional Application No. 60/758,407, filed Jan. 12, 2006, the disclosure of which is herein incorporated by reference.

BACKGROUND OF THE INVENTION

The present invention relates to segmentation of anatomical structures in magnetic resonance imaging (MRI) volumes, and more particularly, to 3D segmentation of anatomical structures of the brain in MRI volumes using graph cuts.

The quantitative analysis of anatomical structures, such as the cerebrum, cerebellum, and the brain stem in MRI brain volumes is important in the study and detection of cerebral disease. In particular, volumetric quantification of cerebral and cerebellar tissues is important in image-based assessment of neuroanatomical disorders such as autism and Asperger's syndrome. The segmentation of the anatomical structures of the brain can be difficult due to problems such as lack of boundaries between the anatomical structures, poor contrast in medical images of the brain, and noise in the images, which is mainly attributed to the image acquisition systems (e.g., MRI) and partial volume effects. Accordingly, because of such problems, image segmentation methods such as active contours or region growing are subject to leakage issues and are not reliable. Since a manual delineation of the anatomical brain structures is too time consuming, various techniques have been developed to increase robustness in segmenting anatomical brain structures. These techniques include active contours with shape model prior knowledge, atlas registration, and interactive graph cuts segmentation.

In active contour with shape model prior knowledge techniques, a prior shape constraint is incorporated into the active contour evolution in order to further constrain the segmentation. Shape priors can be modeled by a known class of shapes or through statistical training. These techniques are highly dependent on the selection of an accurate shape prior. Accordingly, the choice of the models for the training or for the class of shapes determines the accuracy of the segmentation.

In atlas registration techniques, combinations of rigid and non-rigid transformations of an atlas are used to aid in detecting the internal structures in an MR image of the brain. For an atlas to be accurate, the atlas typically must be very complex. Although these techniques can be successful, there typically is a high computational cost and it is difficult to construct an accurate atlas. Thus, these techniques can be time consuming and expensive.

In interactive graph cuts techniques, an MRI brain volume is represented as a discrete graph. The graph is generated using vertices representing the image pixels (or voxels), as well as edges connecting the vertices, typically using 6 or 26 neighborhood connectivity. A user marks certain pixels as object or background, which would define the terminals of the graph. Graph cuts are then calculated to determine the segmentation. The quality of the segmentation depends on the number of seeds used in initialization. In this technique, it can be difficult for a user to accurately mark the object and background. In addition, many seeds must be added in order to give a strong spatial constraint for the graph cuts. Accordingly, graph cuts segmentation techniques can lead to erroneous segmentations.

BRIEF SUMMARY OF THE INVENTION

The present invention overcomes the foregoing and other problems encountered by providing a system and method for segmentation of anatomical structures in MRI volumes using graph cut segmentation based on an anatomical template. The template is used to provide seed points of anatomical structures, and these structures can be segmented in MRI volumes using graph cuts segmentation initialized based on the seed points provided by the template. This invention can be implemented to segment anatomical brain structures such the cerebrum, cerebellum, and brain stem in MRI brain volumes.

In one embodiment of the present invention, a template is registered to an MRI brain volume. The template identifies seed points of anatomical brain structures in the MRI brain volume. At least one anatomical brain structure is segmented in the MRI brain volume using graph cuts segmentation initialized based on the seed points identified by the template. The template can be registered by aligning a centroid of the template with a centroid of the MRI brain volume, and scaling the template to match of size of the MRI brain volume. It is possible that a skull stripping segmentation be applied to the MRI brain volume to separate the brain from non-brain tissue. The segmentation can be hierarchically performed by extracting the cerebrum from the brain, and then separating the cerebellum and the brain stem in the remaining brain volume.

These and other advantages of the invention will be apparent to those of ordinary skill in the art by reference to the following detailed description and the accompanying drawings.

DETAILED DESCRIPTION OF EXEMPLARY EMBODIMENTS

According to an embodiment of the present invention, anatomical structures are segmented in MRI volume data using graph cuts based on an anatomical template. As described herein, the method is implemented to segment anatomical brain structures in MRI brain volumes, however, the present invention is not limited thereto, and may be applied to other types of anatomical structures in various regions of the body as well.

Figure 1A:
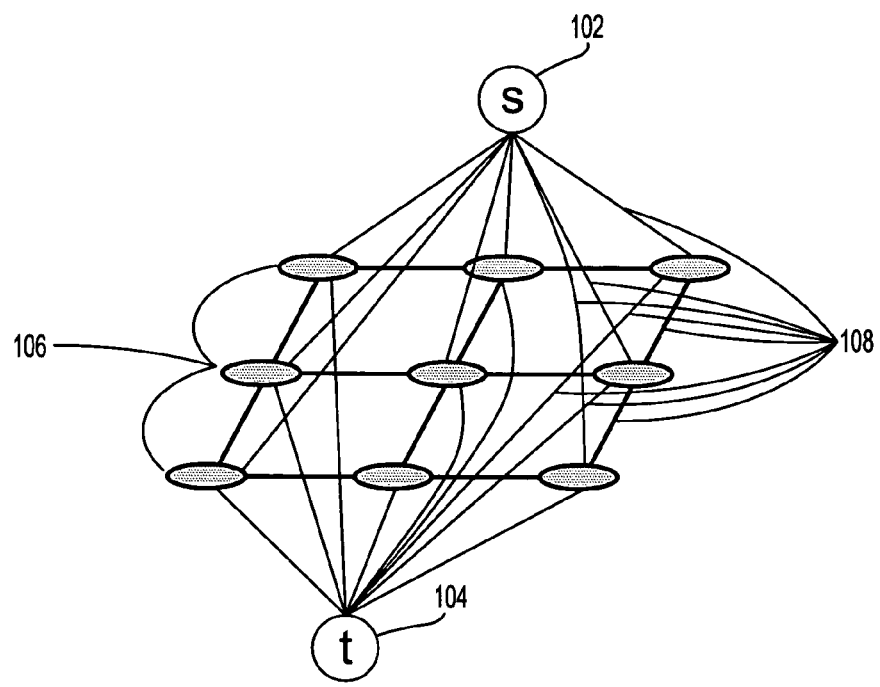
FIGS. 1A and 1B illustrate an exemplary graph for use in graph cut segmentation.
Figure 1B:
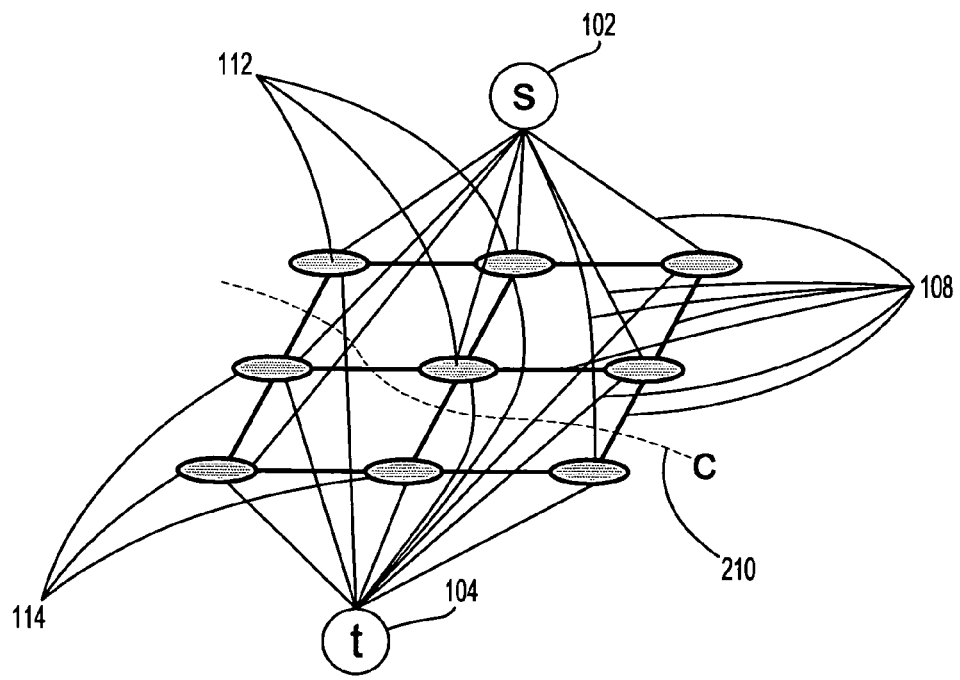

Before discussing specific aspects of the graph cut segmentation algorithm using an anatomical template, graph cut theory will be discussed. In particular, an undirected graph $G=\{V,E\}$ consists of vertices V and undirected edges E that connect the vertices. Each edge $e \in E$ is assigned a non-negative cost $\omega_{e_c}$. There are two special vertices (referred to herein as "terminals") in the graph that are identified as the source s and the sink t. With the exception of the terminals s and t, the vertices are comprised of pixels P of an image to be segmented. The image to be segmented is a digital image, and can be obtained using standard digital photography, as well as medical imaging technology, such as Magnetic Resonance Imaging, ultrasound, x-ray, computed tomography, SPECT, PET, IVUS, OCT, etc. FIG. 1A illustrates an example of a graph for graph cut image segmentation. As illustrated in FIG. 1A, pixels 106 are connected by edges 108 to neighboring pixels 106, as well as the source s 102 and the sink t 104. A cut C on the graph is a partition of V into two disjoint sets S and T=V−S such that s∈S and t∈T. FIG. 1B illustrates a cut C 110 on the graph of FIG. 1A. As illustrated in FIG. 1B, pixels 112 are connected to the source s 102, and pixels 114 are connected to the sink t 104. The pixels 112 connected to the source s 102 are considered the foreground of the image (or the "object"), and the pixels 114 connected to the sink t 104 are considered the background of the image.

The cost of the cut is the sum of the costs of the edges that are severed by the cut, such that:

$$\text{Cost}(C) = \sum_{e_{i,j} \in C} \omega_{i,j}. \quad (1)$$

In order to select a cut C, a minimum cut (i.e., the cut with the smallest cost) must be determined. There are numerous algorithms for finding the minimum, as is well known in the art.

In the case of volume segmentation, the vertices will be voxels P of the volume data and two other nodes denoting the "object" O and "background" B terminals. In order to perform a graph cut volume segmentation for a set of pixels V, it is possible to compute a labeling f that minimizes an energy function. The labeling f labels each pixel as either object or background. The energy function takes the form:

$$E = \sum_{p \in P} \left( D_p(f_p) + \sum_{q \in N(p)} V_{p,q}(f_p, f_q) \right), \quad (2)$$

where E is the energy, p and q are voxels, and N is a neighborhood formed from the vertex connectivity. Here, connectivity refers to the way edges are formed between adjacent voxels in the image. For example, in three dimensions, 6-connectivity implies forming edges between a voxel p and its neighboring voxels to the right, left, up, down, front, and back. The connectivity defines the topology of the graph, $D_p(f_p)$ is a region term that measures the cost of assigning the label $f_p$ (foreground or object) to voxel p, while $V_{p,q}$ is a boundary term that measures the cost of assigning labels $f_p, f_q$ to adjacent voxels p and q.

According to a possible implementation, $D_p(f_p)$ and $V_{p,q}$ can be defined as follows:

$$D_p(f_p) = \begin{cases} \text{MAX} & p \in O, f_p = S \\ \text{MAX} & p \in B, f_p = T \\ 0 & \text{otherwise} \end{cases} \quad (3)$$

where MAX is a large positive constant.

$$V_{p,q} = \begin{cases} \exp\left(\frac{-(I_i - I_j)^2}{2\sigma^2}\right) / \text{dist}(p, q) & p, q \in N \\ 0 & \text{otherwise} \end{cases} \quad (4)$$

where dist(p,q) is the Euclidean distance between voxels p and q. The parameter σ is a constant that denotes the variance of the pixel value inside the object.

Figure 2:
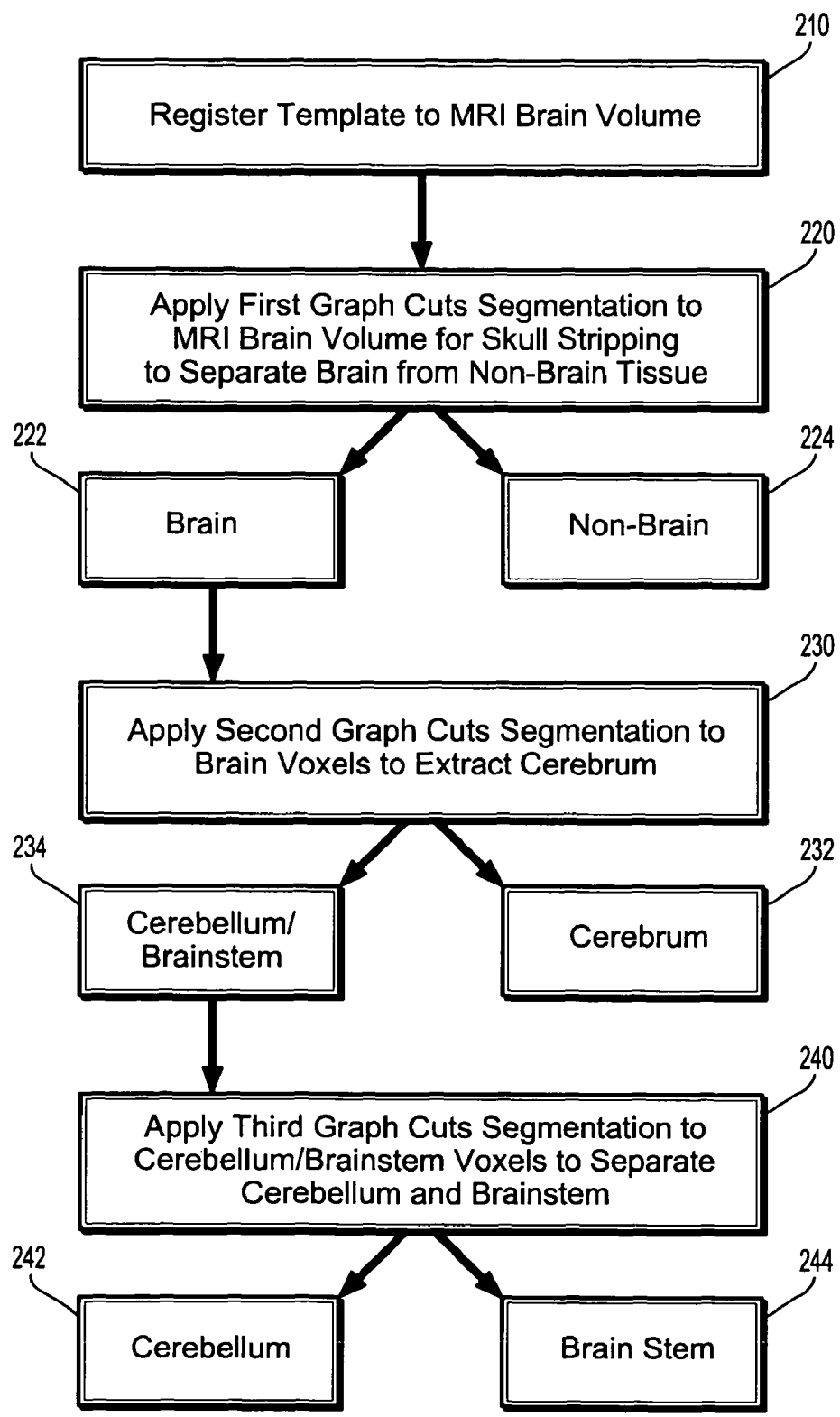
FIG. 2 is a flowchart illustrating a method of segmenting anatomical structures of the brain in MRI volumes according to an embodiment of the present invention.
Figure 3:
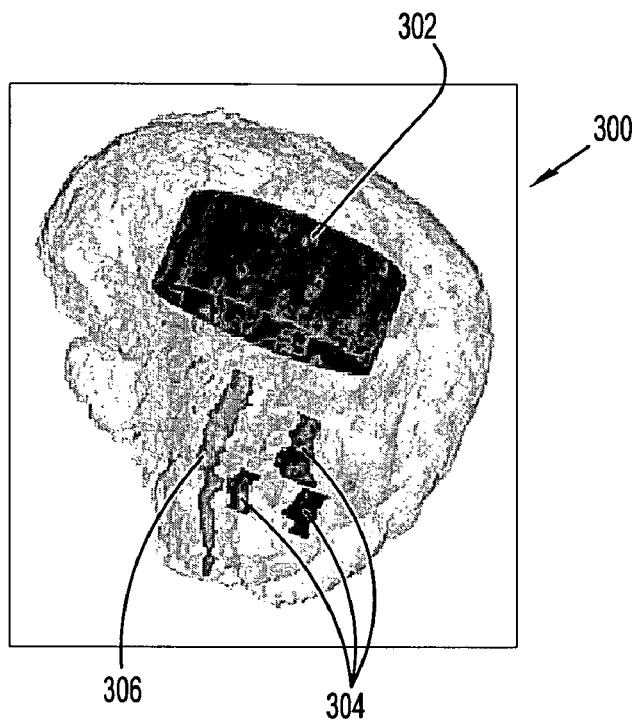
FIG. 3 illustrates an exemplary template for identifying seed points for anatomical brain structures in MRI volumes.

FIG. 2 is a flowchart illustrating a method of segmenting anatomical structures of the brain in MRI volumes according to an embodiment of the present invention. At step 210, a template is registered to an MRI brain volume. The template identifies seed points of anatomical brain structures in the MRI brain volume. The template comprises points that have a high likelihood of being within particular anatomical structure of the brain. These points can be used as seed points to initialize graph cuts segmentation of the anatomical structures. FIG. 3 illustrates an exemplary template 300. As illustrated in FIG. 3, the template includes cerebrum seed points 302, cerebellum seed points 304, and brain stem seed points 306. The cerebrum seed points 302, cerebellum seed points 304, and brain stem seed points 306, are points that are likely to be located within the cerebrum, the cerebellum, and the brain stem, respectively. This template 300 was generated based on sample brain volume data by selecting points on axial slices of the sample brain volume data well within the borders of each of the anatomical structures (i.e., cerebrum, cerebellum, and brain stem).

In order to register the template 300 to MRI brain volume, the centroid of the template 300 is aligned with the centroid of the MRI brain volume. The template 300 is then scaled to match the size of the MRI brain volume. The template 300 is scaled based on the size of a bounding box around the MRI brain volume. The size of the bounding box around the MRI brain volume is determined, and compared to a bounding box around the template 300. The size of the template 300 is then adjusted so that the bounding boxes of the template 300 and the MRI brain volume are the same size. The template 300 then provides voxels in the each of the different anatomical structures of the brain (cerebrum 302, cerebellum 304, and brain stem 306), which can be used as seed points for segmenting the different anatomical structures in the MRI brain volume.

Figure 4:
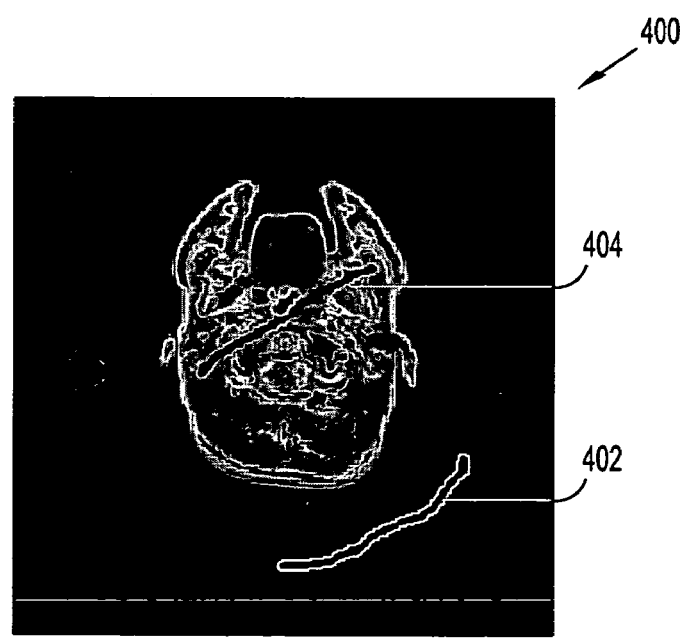
FIG. 4 illustrates an exemplary axial slice that has been brushed by a user to input non-brain tissue seed points.

Once the template 300 is registered to the MRI brain volume, a three-stage segmentation process can be performed to segment the different anatomical structures of the brain, so that every voxel in the MRI brain volume can be classified as, non-brain, cerebrum, cerebellum, or brain stem. Accordingly, returning to FIG. 2, a first graph cuts is applied to the MRI volume data to separate non-brain tissue voxels 224 from brain voxels 222. This is referred to as "skull stripping" because the brain is segmented from the skull and other non-brain tissue. This initialization requires seed points for the brain tissue and for the non-brain tissue. The template 300 is used for the seed points in the brain. Accordingly, the cerebrum seed points 302, cerebellum seed points 304, and brain stem seed points 306 of the template 300 are all used as seed points for first graph cut segmentation. It is possible for the non-brain tissue seed points to be input by a user. For example, a user may "brush" non-brain tissue on at least one slice of the MRI brain volume using an input device, such as a mouse or the like. FIG. 4 illustrates an exemplary axial slice 400 that has been brushed by a user to input non-brain tissue seed points. As illustrated in FIG. 4, voxels 402 representing the background of the axial slice 400, and voxels 404 representing the skull are selected as non-brain tissue seed points. The non-brain tissue seed points 402 and 404 can then be used with the brain seed points 302, 304, and 306 of the template to initialize the skull stripping graph cuts segmentation. For example, the seed points 302, 304, and 306 of the template 300 can be associated with the source terminal and the non-brain tissue seed points 402 and 404 can be associated with the sink terminal. As described above a graph of the voxels is generated and the minimum cut of the graph is determined to segment the voxels in the brain MRI volume. Thus, each voxel in the MRI brain volume is classified as either a brain voxel 222 or a non-brain voxel 224.

At step 230, a second graph cuts segmentation is applied to the brain voxels 222 to extract the cerebrum 232 from remaining brain voxels (i.e., cerebellum and brain stem) 234. This graph cuts segmentation uses the cerebrum seed points 302 of the template 300 for the seed points for the cerebellum and the cerebellum and brain stem seed points 304 and 306 of the template 300 for the seed points for the remaining brain voxels. For example, the cerebrum seed points 302 can be associated with the source terminal and the cerebellum seed points 304 and the brain stem seed points 306 can be associated with the sink terminal. A graph of the brain voxels 222 is generated and the minimum cut of the graph is determined to segment the cerebrum for the rest of the brain. Thus, each of the brain voxels 222 is classified as either a cerebrum voxel 232 or a cerebellum/brain stem voxel 234.

At step 240, a third graph cuts segmentation is applied to the cerebellum/brain stem voxels 234 to separate the cerebellum 242 from the brain stem 244. This graph cuts segmentation is initialized using the cerebellum seed points 304 and the brain stem seed points 306 of the template 300. For example, the cerebellum seed points 304 can be associated with the source terminal and the brain stem seed points 306 can be associated with the sink terminal. A graph of the cerebellum/brain stem voxels 234 is generated and the minimum cut of the graph is determined to segment the cerebellum from the brain stem. Thus, each of the cerebellum/brain stem voxels 234 is classified as either a cerebellum voxel 242 or a brain stem voxel 244.

Accordingly, the anatomical structures of the cerebrum, cerebellum, and brain stem can each be segmented from the MRI brain volume. According to a possible embodiment of the present invention, each of the graph cuts segmentations described in this method can be implemented using a different value of σ. Also, although the method is described as first extracting the cerebrum, then separating the cerebellum and the brain stem, it is possible that these anatomical structures could be extracted in any order.

Figure 5:
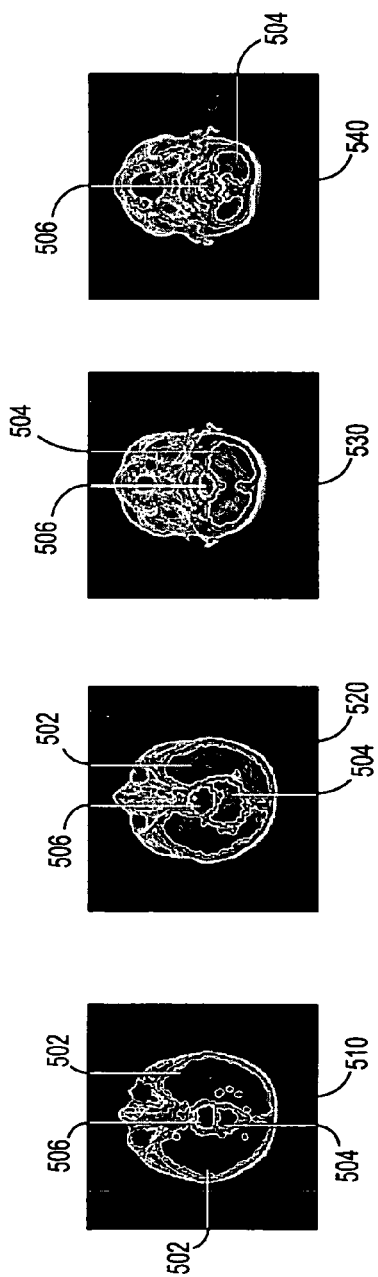
FIG. 5 illustrates axial slices of an MRI brain volume segmented according to an exemplary embodiment of the present invention.

FIG. 5 illustrates axial slices 510, 520, 530, and 540 of an exemplary MRI brain volume segmented using the above described method. In FIG. 5, the segmentation method described above is used to segment the anatomical structures of the brain in T2 MRI axial volumes of a brain with 256*256 slices. The entire segmentation (skull stripping included) can be completed in less than 50 seconds on a computer with a 2.66 GHz processor. As illustrated in FIG. 5, the cerebrum 502, cerebellum 504, and brain stem 506 are segmented in the axial slices 510, 520, 530, and 540.

Figure 6:
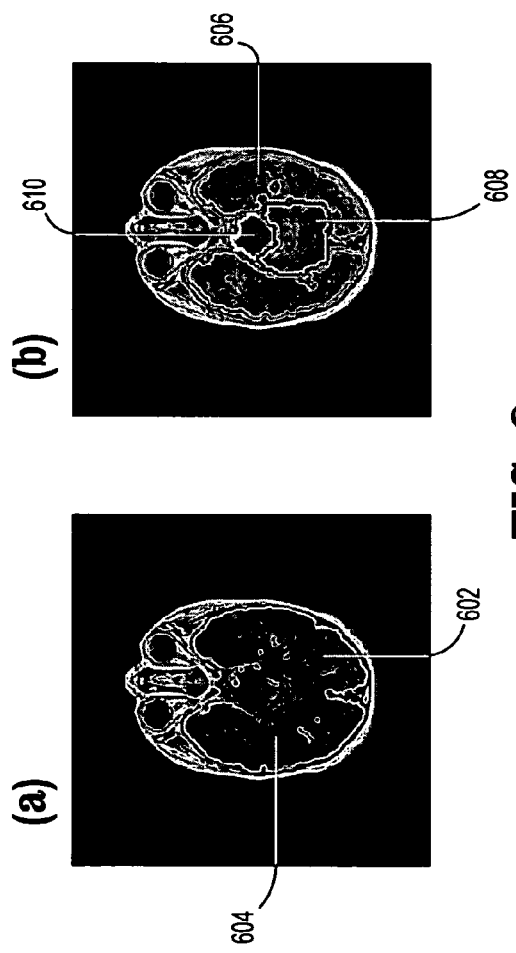
FIG. 6 illustrates an example of the segmentation of the anatomical structures of the brain according to an exemplary embodiment of the present invention in a case in which boundaries between the anatomical structures are unclear.

FIG. 6 illustrates an example of the segmentation of the anatomical structures of the brain in a case in which boundaries between the anatomical structures are unclear. As illustrated in image (a), the border between the cerebrum and the cerebellum is unclear due to partial volume effects at regions 602 and 604. Because of regions 602 and 604 an active contour is likely to fail. However, as illustrated in image (b), the cerebrum 606, cerebellum 608, and the brain stem 610 are successfully segmented using the above described method, regardless of the unclear regions 602 and 604.

The steps of the method described above have been described to give a visual understanding of the brain segmentation method. It is to be understood, that the steps may be performed within a computer system using images stored within the computer system. Accordingly, some steps of the above-described method can occur as internal representations within the computer system.

Figure 7:
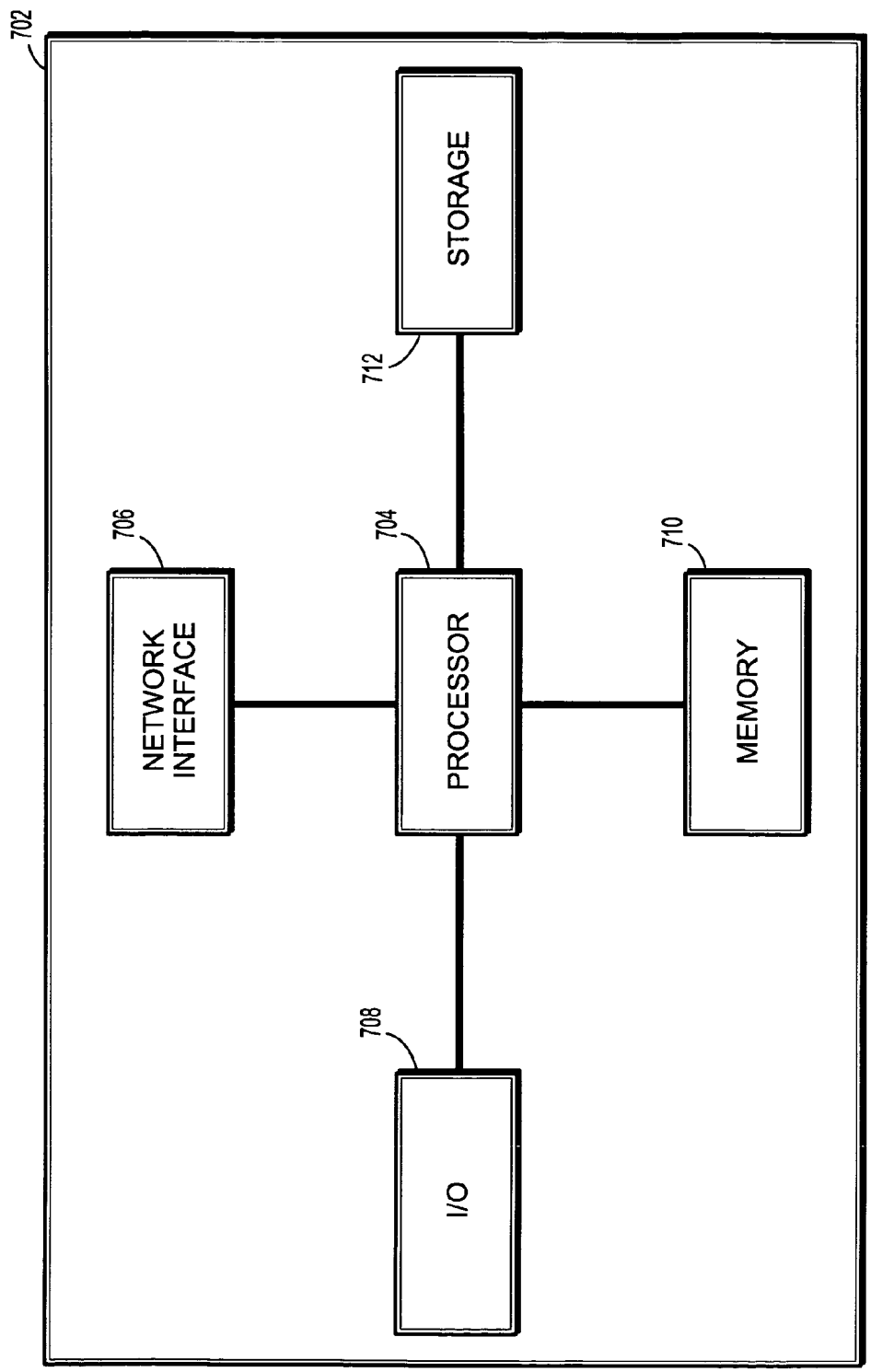
FIG. 7 illustrates a high level block diagram of a computer capable of implementing the present invention.

The method for segmenting anatomical structures of the brain from MRI volumes using graph cuts segmentation based on an anatomical template can be implemented on a computer using well known computer processors, memory units, storage devices, computer software, and other components. A high level block diagram of such a computer is illustrated in FIG. 7. Computer 702 contains a processor 704 which controls the overall operation of the computer 702 by executing computer program instructions which define such operation. The computer program instructions may be stored in a storage device 712 (e.g., magnetic disk) and loaded into memory 710 when execution of the computer program instructions is desired. Thus, applications to perform template registration and graph cuts segmentation can be defined by the computer program instructions stored in the memory 710 and/or storage 712 and controlled by the processor 704 executing the computer program instructions. Furthermore, MRI brain volumes to be segmented and resultant segmented MRI brain volumes can also be stored in the memory 710 and/or the storage. The computer 702 also includes one or more network interfaces 706 for communicating with other devices via a network. The computer 702 also includes input/output 708 which represents devices which allow for user interaction with the computer 702 (e.g., display, keyboard, mouse, speakers, buttons, etc.) One skilled in the art will recognize that an implementation of an actual computer will contain other components as well, and that FIG. 7 is a high level representation of some of the components of such a computer for illustrative purposes The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method for segmenting anatomical structures in an MRI volume, comprising:
   registering a template of seed points to an MRI volume, said template identifying a plurality of specific seed points for each of one or more anatomical structures in the MRI volume, wherein the specific seeds points for each anatomical structure are points that have a high likelihood of being within that anatomical structure; and
   segmenting at least one anatomical structure in the MRI volume using graph cuts segmentation initialized based on the specific seed points identified by the template.

2. The method of claim 1, wherein said MRI volume comprises an MRI brain volume, and said template identifies cerebrum seed points, cerebellum seed points, and brain stem seed points in the MRI brain volume corresponding to the anatomical structures of the cerebrum, cerebellum, and brain stem, respectively.

3. The method of claim 2, wherein said step of segmenting at least one anatomical structure in the MRI volume comprises:
   segmenting brain voxels and non-brain voxels in the MRI brain volume using a first graph cuts segmentation initialized based on a combination of the cerebrum, cerebellum, and brain stem seed points and non-brain tissue seed points;
   extracting the cerebrum in the brain voxels using a second graph cuts segmentation initialized based on the cerebrum seed points and a combination of the cerebellum and brain stem seed points; and
   segmenting the cerebellum and the brain stem in non-cerebrum brain voxels using a third graph cuts segmentation initialized based on the cerebellum seed points and the brain stem seed points.

4. The method of claim 3, further comprising:
   receiving user input identifying said non-brain tissue seed points.

5. The method of claim 2, wherein the MRI brain volume comprises a plurality of voxels, and said step of segmenting at least one anatomical structure in the MRI brain comprises:
   classifying each voxel of the MRI brain volume as one of non-brain, cerebrum, cerebellum, and brain stem using multiple graph cuts segmentations initialized based on said cerebrum, cerebellum, and brain stem seed points.

6. The method of claim 1, wherein said step of registering a template of seed points to an MRI volume comprises:
   aligning a centroid of said template with a centroid of the MRI volume; and
   scaling said template to match a size of the MRI volume.

7. The method of claim 1, wherein said MRI volume comprises an MRI brain volume, said template identifies specific seed points of a plurality of anatomical brain structures in the MRI brain volume, and said step of segmenting at least one anatomical structure in the MRI volume comprises:
   segmenting the MRI brain volume into brain voxels and non-brain voxels using graph cut segmentation initialized based on the seed points of each of the plurality of anatomical brain structures and user input non-brain tissue seed points;
   sequentially extracting each of said plurality of anatomical brain structures from said brain voxels, each anatomical brain structure extracted using graph cut segmentation initialized based on the seed points of the anatomical brain structure.

8. The method of claim 1, wherein said template identifies specific seed points of a plurality of anatomical structures in the MRI volume, and said step of segmenting at least one anatomical structure in the MRI volume comprises:
   generating a graph of voxels of the MRI volume;
   associating the seed points of one of said plurality of anatomical structures with a first terminal of a graph;
   associating the seed points of each remaining one of said plurality of anatomical structures with a second terminal of the graph; and
   segmenting said one of said plurality of anatomical structures by calculating a minimum cut of the graph.

9. A non-transitory computer readable medium storing computer program instructions for performing a method for segmenting anatomical structures in an MRI volume, said computer program instructions defining the steps comprising:
   registering a template of seed points to an MRI volume, said template identifying a plurality of specific seed points for each of one or more anatomical structures in the MRI volume, wherein the specific seeds points for each anatomical structure are points that have a high likelihood of being within that anatomical structure; and
   segmenting at least one anatomical structure in the MRI volume using graph cuts segmentation initialized based on the specific seed points identified by the template.

10. The non-transitory computer readable medium of claim 9, wherein said MRI volume comprise an MRI brain volume, and said template identifies cerebrum seed points, cerebellum seed points, and brain stem seed points in the MRI brain volume corresponding to the anatomical structures of the cerebrum, cerebellum, and brain stem, respectively.

11. The non-transitory computer readable medium of claim 10, wherein the computer program instructions defining the step of segmenting at least one anatomical structure in the MRI volume comprise computer program instructions defining the steps of:
   segmenting brain voxels and non-brain voxels in the MRI brain volume using a first graph cuts segmentation initialized based on a combination of the cerebrum, cerebellum, and brain stem seed points and non-brain tissue seed points;
   extracting the cerebrum in the brain voxels using a second graph cuts segmentation initialized based on the cerebrum seed points and a combination of the cerebellum and brain stem seed points; and
   segmenting the cerebellum and the brain stem in non-cerebrum brain voxels using a third graph cuts segmentation initialized based on the cerebellum seed points and the brain stem seed points.

12. The non-transitory computer readable medium of claim 11, further comprising computer program instructions defining the step of:
   receiving user input identifying said non-brain tissue seed points.

13. The non-transitory computer readable medium of claim 10, wherein the MRI brain volume comprises a plurality of voxels, and the computer program instructions defining the step of segmenting at least one anatomical structure in the MRI volume comprise computer program instructions defining the step of:
   classifying each voxel of the MRI brain volume as one of non-brain, cerebrum, cerebellum, and brain stem using multiple graph cuts segmentations initialized based on said cerebrum, cerebellum, and brain stem seed points.

14. The non-transitory computer readable medium of claim 9, wherein the computer program instructions defining the step of registering a template to an MRI volume comprise computer program instructions defining the steps of:
   aligning a centroid of said template with a centroid of the MRI volume; and
   scaling said template to match a size of the MRI volume.

15. The non-transitory computer readable medium of claim 9, wherein said MRI volume comprises an MRI brain volume, said template identifies specific seed points of a plurality of anatomical brain structures in the MRI brain volume, and the computer program instructions defining the step of segmenting at least one anatomical structure in the MRI volume comprise computer program instructions defining the steps of:
   segmenting the MRI brain volume into brain voxels and non-brain voxels using graph cut segmentation initialized based on the seed points of each of the plurality of anatomical brain structures and user input non-brain tissue seed points;

sequentially extracting each of said plurality of anatomical brain structures from said brain voxels, each anatomical brain structure extracted using graph cut segmentation initialized based on the seed points of the anatomical brain structure.

16. The non-transitory computer readable medium of claim 9, wherein said template identifies specific seed points of a plurality of anatomical structures in the MRI volume, and the computer program instructions defining the step of segmenting at least one anatomical structure in the MRI volume comprise computer program instructions defining the steps of:

generating a graph of voxels of the MRI volume;
associating the seed points of one of said plurality of anatomical structures with a first terminal of a graph;
associating the seed points of each remaining one of said plurality of anatomical structures with a second terminal of the graph; and
segmenting said one of said plurality of anatomical structures by calculating a minimum cut of the graph.

17. A system for segmenting anatomical structures in an MRI volume, comprising:

means for registering a template of seed points to an MRI volume, said template identifying a plurality of specific seed points for each of one or more anatomical structures in the MRI volume, wherein the specific seeds points for each anatomical structure are points that have a high likelihood of being within that anatomical structure; and
means for segmenting at least one anatomical structure in the MRI volume using graph cuts segmentation initialized based on the specific seed points identified by the template.

18. The system of claim 17, wherein said MRI volume comprise and MRI brain volume, and said template identifies cerebrum seed points, cerebellum seed points, and brain stem seed points in the MRI brain volume corresponding to the anatomical structures of the cerebrum, cerebellum, and brain stem, respectively.

19. The system of claim 18, wherein said means for segmenting at least one anatomical structure in the MRI volume comprises:

means for segmenting brain voxels and non-brain voxels in the MRI brain volume using a first graph cuts segmentation initialized based on a combination of the cerebrum, cerebellum, and brain stem seed points and non-brain tissue seed points;
means for extracting the cerebrum in the brain voxels using a second graph cuts segmentation initialized based on the cerebrum seed points and a combination of the cerebellum and brain stem seed points; and
means for segmenting the cerebellum and the brain stem in non-cerebrum brain voxels using a third graph cuts segmentation initialized based on the cerebellum seed points and the brain stem seed points.

20. The system of claim 19, further comprising:
means for receiving user input identifying said non-brain tissue seed points.

21. The system of claim 18, wherein the MRI brain volume comprises a plurality of voxels, and said means for segmenting at least one anatomical structure in the MRI volume comprises:

means for classifying each voxel of the MRI brain volume as one of non-brain, cerebrum, cerebellum, and brain stem using multiple graph cuts segmentations initialized based on said cerebrum, cerebellum, and brain stem seed points.

22. The system of claim 17, wherein said means for registering a template to an MRI volume comprises:

means for aligning a centroid of said template with a centroid of the MRI volume; and
means for scaling said template to match a size of the MRI volume.

23. The system of claim 17, wherein said MRI volume comprises an MRI brain volume, said template identifies specific seed points of a plurality of anatomical brain structures in the MRI brain volume, and said means for segmenting at least one anatomical structure in the MRI volume comprises:

means for segmenting the MRI brain volume into brain voxels and non-brain voxels using graph cut segmentation initialized based on the seed points of each of the plurality of anatomical brain structures and user input non-brain tissue seed points;
means for sequentially extracting each of said plurality of anatomical brain structures from said brain voxels, each anatomical brain structure extracted using graph cut segmentation initialized based on the seed points of the anatomical brain structure.

24. The system of claim 17, wherein said template identifies specific seed points of a plurality of anatomical structures in the MRI volume, and said means for segmenting at least one anatomical structure in the MRI volume comprises:

means for generating a graph of voxels of the MRI volume;
means for associating the seed points of one of said plurality of anatomical structures with a first terminal of a graph and the seed points of each remaining one of said plurality of anatomical structures with a second terminal of the graph; and
means for segmenting said one of said plurality of anatomical structures by calculating a minimum cut of the graph.

* * * * *